(12) United States Patent
Liu et al.

(10) Patent No.: US 9,312,075 B1
(45) Date of Patent: Apr. 12, 2016

(54) HIGH VOLTAGE TANTALUM ANODE AND METHOD OF MANUFACTURE

(71) Applicant: Greatbatch Ltd., Clarence, NY (US)

(72) Inventors: Yanming Liu, Simpsonville, SC (US); Barry C. Muffoletto, Alden, NY (US); Jason T. Hahl, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 14/479,689

(22) Filed: Sep. 8, 2014

Related U.S. Application Data (60) Provisional application No. 61/874,573, filed on Sep. 6, 2013.

(51) Int. Cl.
*H01G 9/00* (2006.01)
*B22F 5/00* (2006.01)
*H01G 9/052* (2006.01)
*H01G 9/145* (2006.01)
*H01G 9/10* (2006.01)
*H01G 9/02* (2006.01)
*B22F 3/24* (2006.01)

(52) U.S. Cl.
CPC ............... *H01G 9/0525* (2013.01); *H01G 9/02* (2013.01); *H01G 9/10* (2013.01); *H01G 9/145* (2013.01); *B22F 5/00* (2013.01); *B22F 2003/242* (2013.01)

(58) Field of Classification Search
None
See application file for complete search history.

(56) References Cited

U.S. PATENT DOCUMENTS

| | | |
|---|---|---|
| 2,277,687 A | 3/1942 | Brennan |
| 2,278,161 A | 3/1942 | Brennan |
| 2,299,667 A | 10/1942 | Waterman |
| 2,310,932 A | 2/1943 | Brennan et al. |
| 2,616,165 A | 11/1952 | Brennan |
| 3,277,564 A | 10/1966 | Webber et al. |
| 3,379,000 A | 4/1968 | Webber et al. |
| 3,394,213 A | 7/1968 | Roberts et al. |
| 3,418,106 A | 12/1968 | Pierret |
| 3,473,915 A | 10/1969 | Pierret |
| 3,567,407 A | 3/1971 | Yoblin |
| 3,698,863 A | 10/1972 | Roberts et al. |
| 3,740,834 A | 6/1973 | Douglass |
| 3,742,369 A | 6/1973 | Douglass |
| 4,017,302 A | 4/1977 | Bates et al. |
| 4,441,927 A * | 4/1984 | Getz et al. ............... 75/229 |
| 4,502,884 A | 3/1985 | Fife |
| 4,578,738 A | 3/1986 | Zoltan |
| 4,722,756 A * | 2/1988 | Hard ............... 148/513 |
| 4,940,490 A | 7/1990 | Fife et al. |
| 5,034,857 A | 7/1991 | Wong |
| 5,211,741 A | 5/1993 | Fife |

(Continued)

*Primary Examiner* — Scott B Geyer
(74) *Attorney, Agent, or Firm* — Michael F. Scalise (57) ABSTRACT

Tantalum powders produced using a tantalum fiber precursor are described. The tantalum fiber precursor is chopped or cut into short lengths having a uniform fiber thickness and favorable aspect ratio. The chopped fibers are formed into a primary powder having a controlled size and shape, narrow/tight particle size distribution, and low impurity level. The primary powder is then agglomerated into an agglomerated powder displaying suitable flowability and pressability such that pellets with good structural integrity and uniform pellet porosity are manufacturable. The pellet is sintered and anodized to a desired formation voltage. The thusly created capacitor anode has a dual morphology or dual porosity provided by a primary porosity of the individual tantalum fibers making up the primary powder and a larger secondary porosity formed between the primary powders agglomerated into the agglomerated powder.

18 Claims, 10 Drawing Sheets

(56) References Cited

U.S. PATENT DOCUMENTS

| | | | |
|---|---|---|---|
| 5,217,526 A | 6/1993 | Fife | |
| 5,245,514 A | 9/1993 | Fife et al. | |
| 5,284,531 A | 2/1994 | Fife | |
| 5,306,462 A | 4/1994 | Fife | |
| 5,448,447 A * | 9/1995 | Chang | 361/529 |
| 5,580,367 A | 12/1996 | Fife | |
| 5,869,196 A | 2/1999 | Wong et al. | |
| 5,894,403 A | 4/1999 | Shah et al. | |
| 5,920,455 A | 7/1999 | Shah et al. | |
| 5,926,362 A | 7/1999 | Muffoletto et al. | |
| 6,224,985 B1 | 5/2001 | Shah et al. | |
| 6,334,879 B1 | 1/2002 | Muffoletto et al. | |
| 6,468,605 B2 | 10/2002 | Shah et al. | |
| 6,687,117 B2 | 2/2004 | Liu et al. | |
| 6,859,353 B2 | 2/2005 | Elliott et al. | |
| 6,965,510 B1 | 11/2005 | Liu et al. | |
| 7,012,799 B2 | 3/2006 | Muffoletto et al. | |
| 7,072,171 B1 | 7/2006 | Muffoletto et al. | |
| 7,092,242 B1 | 8/2006 | Gloss et al. | |
| 7,116,547 B2 | 10/2006 | Seitz et al. | |
| 7,146,709 B2 | 12/2006 | Wong | |
| 7,271,994 B2 | 9/2007 | Stemen et al. | |
| 7,286,336 B2 | 10/2007 | Liu et al. | |
| 7,342,774 B2 | 3/2008 | Hossick-Schott et al. | |
| 7,480,978 B1 | 1/2009 | Wong | |
| 7,483,260 B2 | 1/2009 | Ziarniak et al. | |
| 7,666,247 B2 | 2/2010 | He et al. | |
| 7,679,885 B2 * | 3/2010 | Mizusaki et al. | 361/529 |
| 7,727,372 B2 | 6/2010 | Liu et al. | |
| 7,813,107 B1 | 10/2010 | Druding et al. | |
| 7,837,743 B2 | 11/2010 | Gaffney et al. | |
| 7,879,217 B2 | 2/2011 | Goad et al. | |
| 7,983,022 B2 | 7/2011 | O'Connor et al. | |
| 8,081,419 B2 | 12/2011 | Monroe et al. | |
| 8,313,621 B2 | 11/2012 | Goad et al. | |
| 2004/0244185 A1 | 12/2004 | Wong | |
| 2007/0214857 A1 | 9/2007 | Wong et al. | |
| 2008/0072407 A1 | 3/2008 | Wong | |
| 2009/0044398 A1 | 2/2009 | Wong | |

\* cited by examiner

HIGH VOLTAGE TANTALUM ANODE AND METHOD OF MANUFACTURE

CROSS-REFERENCE TO RELATED APPLICATION

This application claims priority to U.S. provisional patent application Ser. No. 61/874,573, filed on Sep. 6, 2013.

BACKGROUND OF THE INVENTION

1. Field of the Invention

The present invention generally relates to a valve metal anode for a capacitor, and more particularly, to an electrolytic capacitor comprising an anode formed from a pressed pellet of tantalum fibers. The tantalum fiber pellet is sintered and then anodized into a high voltage anode at formation voltages up to 550V.

2. Prior Art

Development of powders suitable for making a tantalum capacitor has been a focus of both capacitor producers and tantalum processors. Historically, the intent has been to delineate requirements for tantalum powder that will result in capacitors having reliable performance, particularly in demanding high voltage applications such as cardiac defibrillation. It is understood that demanding applications, such as cardiac defibrillation, require tantalum powders having suitable surface area, high purity, uniform feature size, optimized shrinkage, favorable flowability and pressability, and green pellet strength.

Wet tantalum capacitors have been used in implantable cardiac defibrillators as the output energy storage capacitor for delivering the therapeutic electrical shock to the heart to stop a defibrillation event. These shocks are generally delivered at voltages ranging from approximately 650 volts to 950 volts. To achieve therapy delivery at such high voltage levels, between three and four tantalum capacitors are typically used in the output stage of the defibrillator.

Several advantages are associated with reducing the number of capacitors. For example, fewer capacitors required for energy storage simplifies the device charge and discharge circuits. Also, a reduction in the number of capacitors results in a reduction in the number of components in the device. Fewer components mean that the potential for performance issues decreases, thereby favorably impacting reliability. Other advantages of fewer components are more efficient assembly and lower cost.

Accordingly, one purpose of this invention is to develop a manufacturing process for tantalum anodes that are suitable for building an electrolytic capacitor for incorporation into a cardiac defibrillator. The manufacturing processes include pressing, sintering and forming steps. It is also the purpose of this invention to fabricate a tantalum anode that is capable of being formed at higher voltages than is currently known in the prior art. An anode for high voltage applications such as described within must also have a pore structure and internal surface area that allows for low ESR and high capacitance.

It is known in the art that ESR is related to energy loss. It is also known that for a capacitor, energy loss during charging and discharging impacts capacitor efficiency. Hence, a lower ESR of an anode made in accordance with the present invention improves the efficiency of the capacitor. This is of significance in cardiac defibrillation as discharge of the capacitor delivers the energy needed to return the heart to normal rhythm. The improved efficiency achieved by the present invention enables delivery of energy and higher voltages, and allows for smaller batteries to be used in implantable defibrillators due to less energy being required to charge the capacitors. Improvement in the capacitance per unit volume of an anode of the present invention allows more charge to be stored per unit volume, resulting in a capacitor that stores more energy per unit volume.

When tantalum powders are formed into a porous anode body and then sintered for use in an electrolytic capacitor, it is known that the resultant anode capacitance is proportional to the specific surface area of the sintered porous body. The greater the specific surface area after sintering, the greater the anode capacitance ($\mu$FV/g) is. Since the anode capacitance ($\mu$FV/g) of a tantalum pellet is a function of the specific surface area of the sintered powder, one way to achieve a greater net surface area is by increasing the quantity (grams) of powder per pellet. However, with this approach cost and size increase considerably. Consequently, cost and size considerations dictate that tantalum powder development focus on means to increase the specific surface area of the powder itself.

Figure 1:
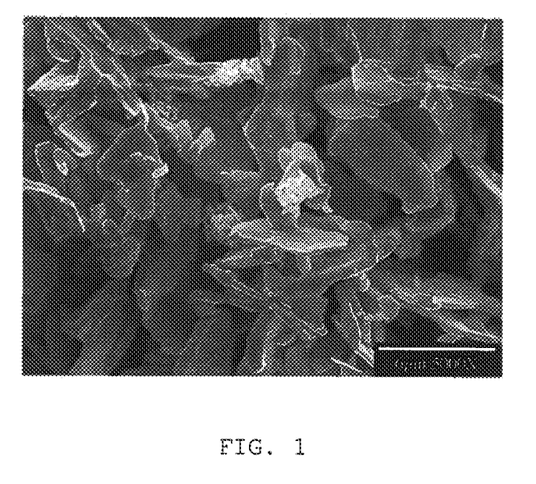
FIG. 1 is an SEM photograph at 5,000× showing flake tantalum particles according to the prior art.

Prior art methods for increasing the specific surface area of tantalum powder include flattening the powder particles into a flake shape or spherical granulation to produce ovular particle shapes. For example, U.S. Pat. No. 4,940,490 to Fife et al., U.S. Pat. No. 5,211,741 to Fife and U.S. Pat. No. 5,580,367 to Fife disclose flaked tantalum powders and methods for making the flaked powders. FIG. 1 is an SEM photograph at 5,000× showing flake tantalum particles according to the prior art.

However, efforts to further increase specific surface area by making thinner tantalum flakes have been hindered by concomitant loss of processing characteristics. For example, several of the major deficiencies of very thin tantalum flake are poor flow characteristics, poor pressability and low green strength, and low forming voltages. Moreover, increasing particle size using spherical granulation still tends to result in particles that are finer than desirable. The resultant pore size and structure of pellets made from spherical particles tend to be smaller. Pellet structure damage during high temperature formation is a further area of concern.

Figure 2:
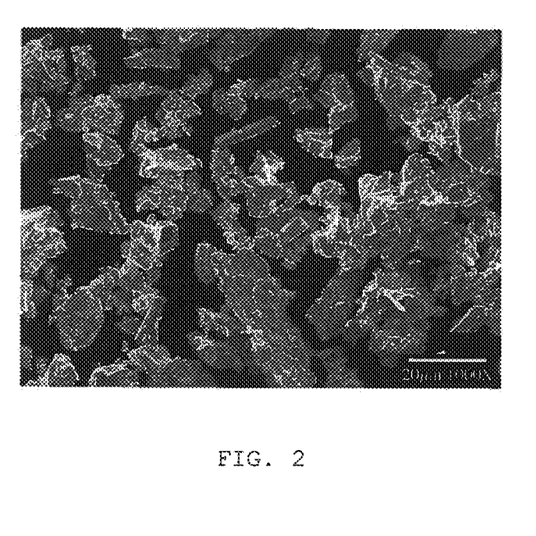
FIG. 2 is an SEM photograph at 1,000× showing EB melt tantalum particles according to the prior art.

One commonly used tantalum powder having relatively large particles is commercially available from H. C. Starck under the designation QR-3. This so called EB melt-type tantalum powder permits anodes to be made with relatively larger pore structures. The larger pore structures allow formation electrolytes to cool the interior of the pellets during formation. However, the relatively small surface area of these large particle size powders does not result in anodes of high capacitance per unit volume. That is because the relatively large particle size results in excessive amounts of tantalum metal remaining after formation of tantalum oxide. FIG. 2 is an SEM photograph at 1,000× showing EB melt tantalum particles according to the prior art.

Figure 3:
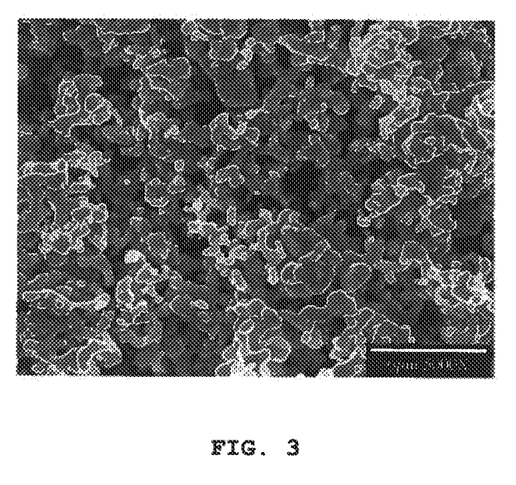
FIG. 3 is an SEM photograph at 5.000× showing a sodium reduced tantalum powder agglomerate according to the prior art.

Another commonly used material is available from H. C. Starck as sodium reduced tantalum powder under the designation NH-175. Because of its relatively higher surface area, this material is known to produce anodes with higher capacitance than QR-3 powders. However, because of its smaller feature size and broad particle size distribution, NH-175 powders are also known to produce anodes with smaller pore structures. The smaller pore structure makes internal cooling of anode pellets during anodization more difficult, and limits the formation voltages that these anodes can achieve. If formation voltage gets too high, many of the NH-175 tantalum particles are formed completely through, leaving no conductive pathways behind the tantalum oxide. FIG. 3 is an SEM photograph at 5,000× showing a sodium reduced NH-175 tantalum powder agglomerate according to the prior art.

Purity of the powder is another important consideration. Metallic and non-metallic contamination tends to degrade the dielectric oxide film in tantalum capacitors. While high sintering temperatures serve to remove some volatile contaminants, not all may be removed sufficiently, resulting in sites having high DC leakage. High DC leakage is known to contribute to premature electrical failures, particularly in high voltage applications. Further, high sintering temperatures tend to shrink the porous anode body, thereby reducing its net specific surface area and thus the capacitance of the resulting capacitor. Therefore, minimizing loss of specific surface area under sintering conditions, i.e., shrinkage, is necessary in order to produce high µFV/g tantalum capacitors.

Flowability of tantalum powder and green strength (mechanical strength of pressed, unsintered powder pellets) are also important characteristics for a capacitor producer. Not only does flowability provide for efficient pellet production, it provides for high volume, automated pellet production. Flowability of agglomerated tantalum powder is even more essential to production efficiency and proper operation of automatic pellet presses. Sufficient green strength permits handling and transport of a pressed product, e.g., pellet, without excessive breakage or pellet damage (detectable and undetectable) that could affect production reject rates and finished product performance.

Accordingly, what is needed is a tantalum fiber of a strictly controlled diameter such that sufficient metal remains after formation to provide a conductive matrix behind the dielectric oxide. Because of the tightly controlled fiber diameter according to the present invention, fiber diameter can be minimized to a greater extent than with other prior art powder types. By minimizing fiber diameter while ensuring that tantalum is not totally consumed during formation, the dielectric surface area can be maximized without isolating dielectric area due to loss of tantalum substrate.

In that respect, a tantalum anode according to the present invention is distinguishable from the prior art. Regardless whether the tantalum is of a flake or spherical shape manufactured by the beam melt (QR-3 powder) or sodium reduction processes (NH-175 powder), the present invention uniquely discloses the pressing and sintering of an agglomerate of tantalum fibers having a tightly controlled aspect ratio. The result is an electrode pellet having a dual morphology and that is capable of being anodized into a capacitor anode at formation voltages up to 550V.

SUMMARY OF THE INVENTION

In order to generate high voltage anodes having high capacitance, and therefore high energy density, anodes having high per unit surface area must be fabricated. High surface area anodes must also have pore structures that allow for good internal cooling during anode formation, and have lower ESR both during formation and subsequently while in use in the finished capacitor. The use of tantalum anodes made from tantalum fibers according to the present invention improves on these issues.

In the present invention, the diameter of the tantalum fibers used to generate the finished pellet is tightly controlled. First, the tantalum fibers are divided into desired lengths (up to 50 microns) to form a randomly oriented, porous powder (primary powder). The primary powder is subsequently subjected to an agglomeration process to thereby form an agglomerated powder of the tantalum fibers. An exemplary agglomeration process is described in U.S. Pat. No. 5,217,526 to Fife wherein tantalum fibers of the primary powder are heat treated at 1,000° C. for 30 minutes. The random agglomerate structure is stabilized by fiber-to-fiber bonding (sintering). Another agglomeration process is useful with the present invention is described in U.S. Pat. No. 4,017,302 to Bates et al. The '526 and '302 patents to Fife and Bates et al, are incorporated herein by reference. The resulting agglomerated powder has very narrow particle and pore size distribution. The agglomerated powder can be pressed into a pellet of a desired shape comprising the tantalum fibers of the tightly controlled diameter used to make the primary powder, but with a pellet structure provided with larger sized pores provided by the agglomeration of the primary powder. This so called "dual morphology" or dual porosity pellet structure allows for better electrolyte penetration. Better electrolyte penetration aids in both cooling of the pellet during formation as well as lowering the ESR of the pellet when used as an anode in a capacitor.

These and other objects of the present invention will become increasingly more apparent to those skilled in the art by reference to the following detailed description and the appended drawings.

DETAILED DESCRIPTION OF THE PREFERRED EMBODIMENTS

As defined herein, a fiber is a very fine thread or threadlike tantalum filament of indefinite length. A primary powder is a mass of loose tantalum fibers. An agglomerated powder is a mass of primary powders which have been bonded together through an agglomeration process by heating the primary powder under chemically non-reactive conditions to a temperature sufficient to form stabilized fiber-to-fiber bonding. The resulting tantalum bodies consist essentially of short relatively uniform diameter tantalum fibers, bonded and randomly oriented in a substantially non-aligned, porous array.

Figure 4A:
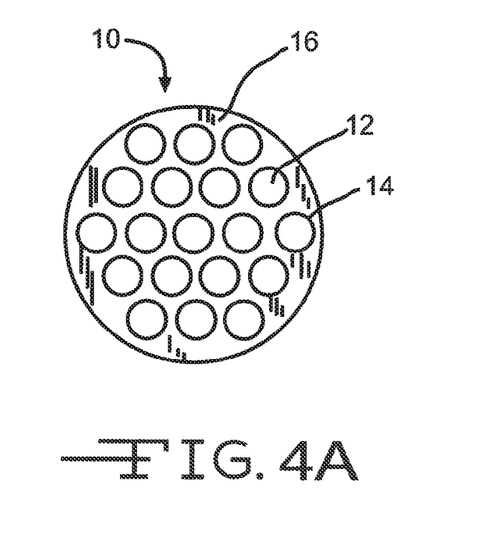
FIG. 4A is a transverse cross section of a primary billet 10 used in the production of tantalum fibers.
Figure 4B:
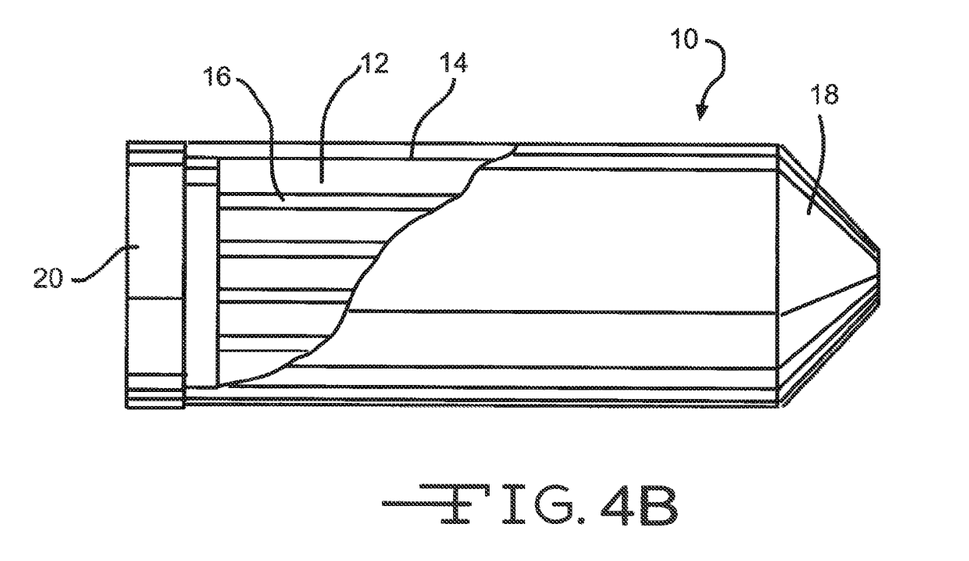
FIG. 4B is a cutaway view of the primary billet 10 shown in FIG. 4A revealing the longitudinal disposition of the billet components.

As shown in FIGS. 4A and 45, the process for manufacturing tantalum fibers for fabricating a tantalum anode that are useful for building capacitors according to the present invention begins as a primary billet 10 comprising tantalum rods 12 that have been inserted into holes 14 drilled longitudinally into a copper matrix 16. In the matrix, copper separates the tantalum rods 12 from each other. The rods 12 run longitudinally through the body of the billet and are substantially uniform in diameter and aligned in parallel. After assembly, a copper nose 18 and tail 20 are welded onto the primary billet 10, and the billet is then evacuated and sealed. At this point the primary billet. 10 may optionally be hot or cold isostatically pressed in order to collapse any void space, thereby promoting filament uniformity.

The primary billet 10 containing the tantalum rods 12 in a copper matrix 16 is extruded at elevated temperature at a diameter reduction ratio of approximately 6:1. The resulting rod is cropped and then drawn down to restack diameter. Annealing may optionally be performed during drawing should the wire become too stiff or breakage occurs. Annealing temperatures for tantalum are typically in the range of 900° C.

Figure 5:
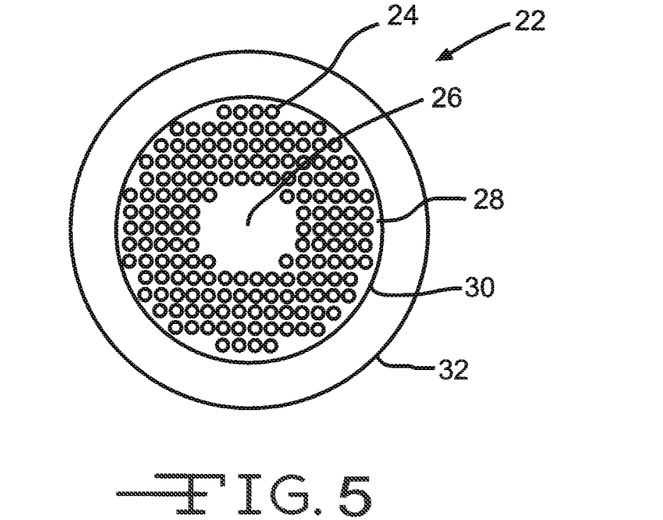
FIG. 5 is a schematic depiction of the transverse cross section of the secondary billet 22 used to make tantalum fibers.

At restack diameter, the composite wire is cut into lengths for assembly into a secondary billet 22 (FIG. 5). The sub-elements 24 made from the primary billet are stacked together with copper rods. The copper rods are used to form a copper core 26 and an outer annulus 28. The core 26 and the outer annulus 28 make leaching of the final composite less difficult. An outer tantalum sheet 30 covers the assembly of sub-elements and copper rods. The sheet 30 is the same length as the rods and it completely surrounds the filament array. Outside the cylinder of tantalum sheet is an outer copper can 32.

The secondary billet 22 is assembled, a nose and tail (not shown) are welded into place, and the billet is evacuated and sealed. The sealed billet is optionally prepared for extrusion by hot or cold isostatic pressing in order to collapse any void space within the billet and to promote filament uniformity. After isostatic pressing, the secondary billet is machined to fit the extrusion liner. The billet is then extruded at elevated temperature at a diameter reduction ratio of 6:1.

The extruded rod is cropped, and the rod is then drawn to a diameter where the tantalum filament diameter is 5 microns or less. Again, annealing steps may be employed if necessary. At final size, the composite tantalum wire is cut into short lengths as required.

Figure 6:
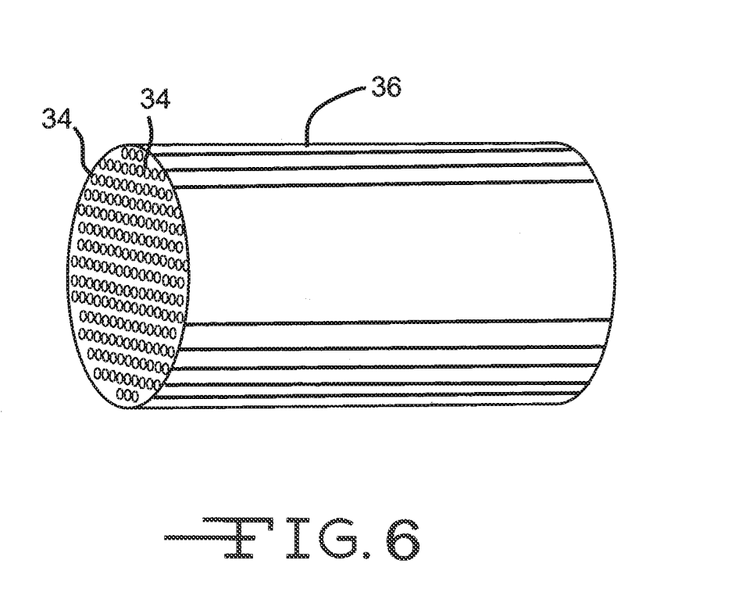
FIG. 6 is a schematic depiction showing a cylindrical body containing a plurality of tantalum fibers.
Figure 7:
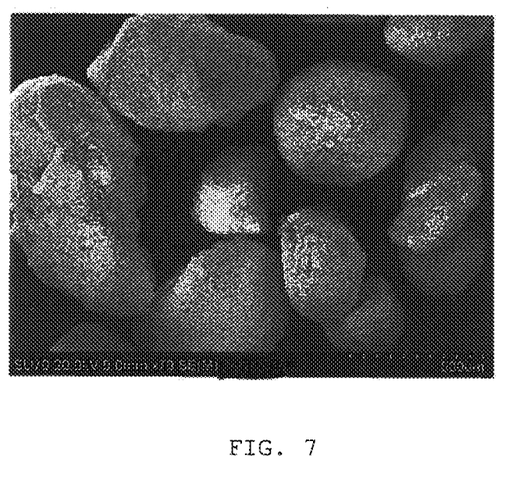
FIGS. 7 and 8 are SEM photographs at 70× and 500×, respectively, showing the present tantalum powder as coarse agglomerate with high surface area and small pore structure.
Figure 8:
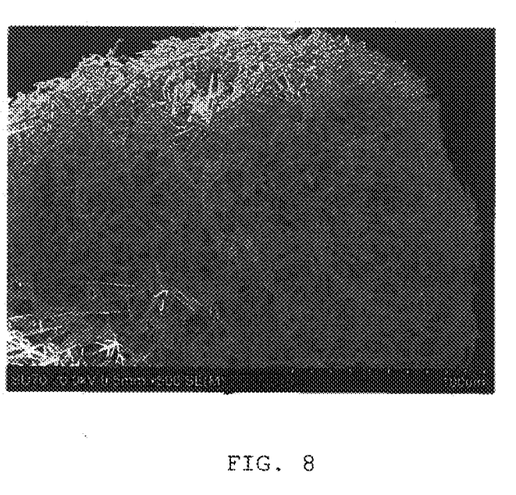
Figure 9:
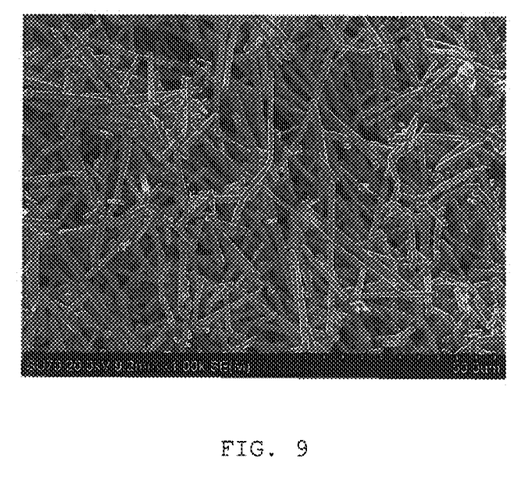
FIGS. 9 and 10 are SEM photographs at 1,000× and 2,000×, respectively, showing the present tantalum powder having a relatively uniform fiber diameter.
Figure 10:
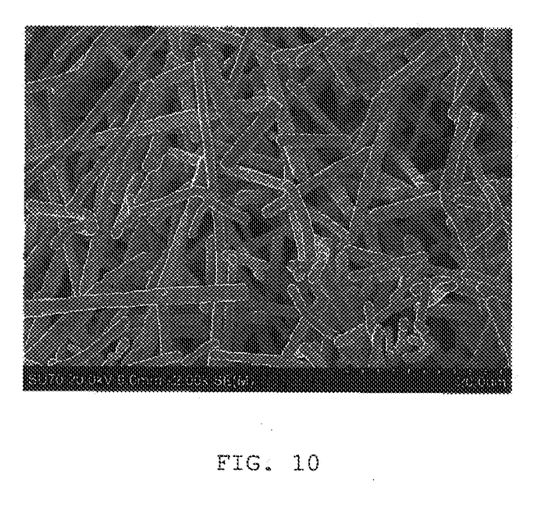
Figure 11:
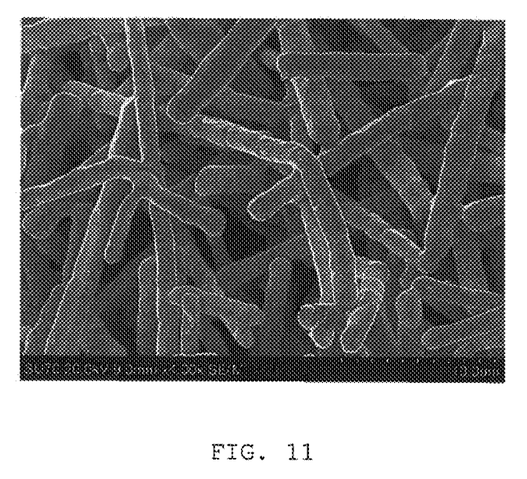
FIG. 11 is an SEM photograph at 4,000× showing the present tantalum powder having good random 3-D fiber orientation.
Figure 12:
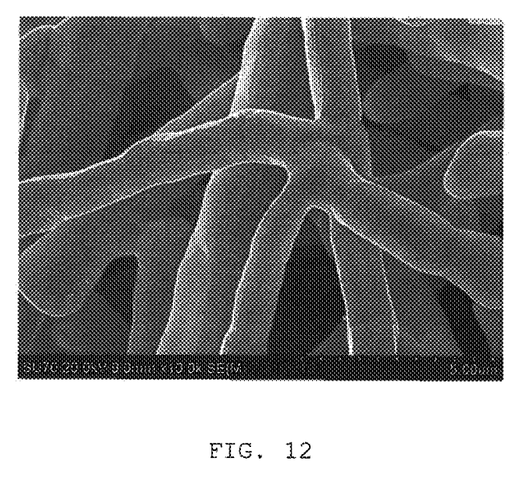
FIG. 12 is an SEM photograph at 10,000× showing the present tantalum powder having good uniform inter-particle spacing.

The cut sections are immersed in a solution of nitric acid and water, and for a period of time sufficient for the acid to fully leach out the copper core 26 and outer annulus 28, leaving copper tantalum filaments and the tantalum sheath 32 behind. Since the tantalum filaments are comparatively tightly spaced, the copper core 26 and annulus 28 etch away much more rapidly than the copper separating the filaments. As a result, the acid eventually surrounds the annulus of tantalum filaments, and then attacks the filament matrix from all directions, rather than just from the ends of the cut sections. The total leaching time depend primarily upon the composite wire diameter and length, with smaller diameters and greater lengths requiring longer times. After leaching, a plurality of fine tantalum filaments (<5 micron diameter) surrounded by a thin tantalum tube 36 is left behind. The tube 36 is removed, leaving the tantalum filaments 34 behind. The tantalum fibers are of an optimum diameter range of 0.5 μm to 2.5 μm. That the tantalum filaments are of a strictly controlled diameter range is important for fabrication of an anode according to the present invention. Not only must the tantalum filaments be of a prescribed diameter, the above preparation process provides filaments of a narrow length range and high purity substantially free of copper.

For more detail regarding production of tantalum filaments that are useful in the present invention, reference is made to U.S. Pat. No. 5,034,857 to Wong and U.S. Pat. No. 5,869,196 to Wong et. al., which are incorporated herein by reference. Other exemplary processes for forming tantalum fibers useful in the present invention are disclosed in U.S. Pat. Nos. 3,277,564, 3,379,000, 3,394,213, 3,567,407, 3,698,863, 3,742,369, 4,502,884, 5,217,526, 5,284,531, 5,245,514, and 5,306,462, the contents of which are incorporated by reference herein.

FIGS. 7 to 12 are SEM photographs at various magnifications showing tantalum fibers according to the present invention.

The thusly produced tantalum fibers allow for the generation of anodes having a dual morphology. This dual morphology provides a higher surface area material compared to prior art powders. The term "dual morphology" means there are two pore structures within the pressed tantalum anode pellet. First, the previously described tantalum fibers that have been drawn in a tightly controlled manner to an optimum diameter range of 0.5 μm to 2.5 μm are chopped to an optimum length ranging from 5 μm to 50 μm. The chopped fibers have a length-to-width aspect ratio ranging from 2 to 100. A more preferred aspect length-to-width ratio ranges from 10 to 40. These fibers form a primary powder as a loosely packed mass of the tantalum fibers.

Then, an agglomerated powder is formed by subjecting the primary powder to an agglomeration process. During agglomeration, for example, the tantalum fibers of the primary powder are heat treated at 1,000° C. for 30 minutes. This serves to stabilize the agglomerate structure through fiber-to-fiber bonding (sintering). As previously discussed, exemplary agglomerating processes are described U.S. Pat. No. 4,017,302 to Bates et al. and U.S. Pat. No. 5,217,526 to Fife.

Thus, agglomeration serves to bond the primary powders together into bodies consisting essentially of the short (5 μm to 50 μm) tantalum fibers, bonded and randomly oriented in a substantially non-aligned, porous array. The tight diameter distribution of the tantalum fibers in the agglomerated powder provides a relatively high surface area that is optimally suited to provide high capacitance per unit volume of a pressed pellet. The relatively small pores in the primary powder, however, cause higher ESR than is desirable. The agglomerated powder compensates for this by providing more open pore structure than in the primary powder when used to manufacture an anode pellet. Thus, the dual morphology or dual porosity is the result of the porosity between the individual tantalum fibers making up the agglomerate powder and the larger secondary porosity formed between the agglomerated powder in the body of the anode.

Table 1 below provides more detail on powder particle characteristics. As used this table, a diameter is defined as a straight line passing from side to side of a tantalum fiber, through its center.

TABLE 1

| Primary Powder (Fiber) | |
| --- | --- |
| Fiber Diameter | 0.5-2.5 μm |
| Fiber Length | 5-50 μm |
| L/D Aspect Ratio | 2-100 |
| (Preferred Range) | 10-40 |
| Agglomerated Particle | |
| Agglomerate Density | 1.5-4.5 g/cc |
| (Preferred Range) | 2.5-3.5 g/cc |
| Agglomerate Dia. Distribution | d50: 200-500 μm |
| | d10: 74 μm |
| | d90: 1,000 μm |
| Agglomerate Pore Size | d50: 1-5 μm |
| (Preferred Range) | d50: 2-3 μm |
| Agglomerate Pore Distribution | d10: 0.5 μm |
| | d90: 20 μm |

Next, the tantalum agglomerate of a pore size from about 2 μm to about 3 μm comprising a random distribution of fibers of a diameter of from about 0.5 μm to about 2.5 μm and of a length of from about 5 μm to about 50 μm is pressed into a pellet of a desired shape. The pellet contains thousands of the tantalum agglomerates (a plurality). The pressed anode pellet has a relatively larger pore structure with lower resistance pathways within. Moreover, this open, lower resistance structure allows for better cooling of the anode pellet during the anode formation process avoiding the issues associated with prior art tantalum anode formation.

A "pellet", as the term is used herein, is a porous mass, body or structure comprised of agglomerated tantalum powder having the size and shape characteristics set forth in Table 1. Green strength is a measure of a pellet's mechanical strength prior to sintering. The term "pressability" describes the ability of a tantalum powder to be pressed into a pellet. Tantalum powder that can be formed into pellets that retain their shape with sufficient green strength to withstand ordinary processing and manufacturing conditions without significant breakage have good pressability.

Figure 13:
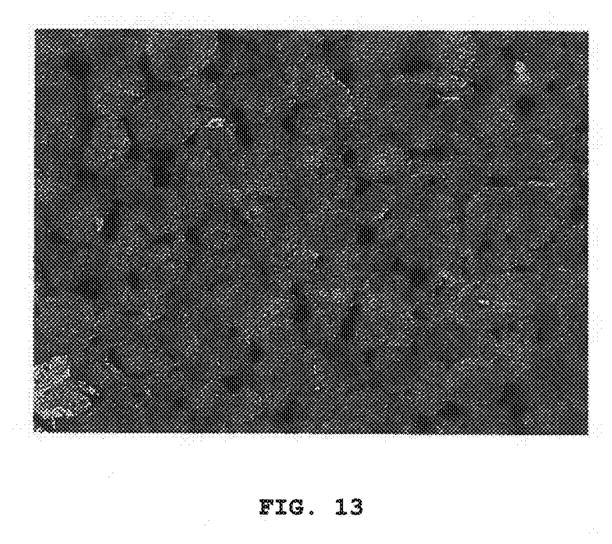
FIG. 13 is an SEM photograph at 25× showing the pore structure of a pellet pressed from a tantalum powder according to the present invention.
Figure 14:
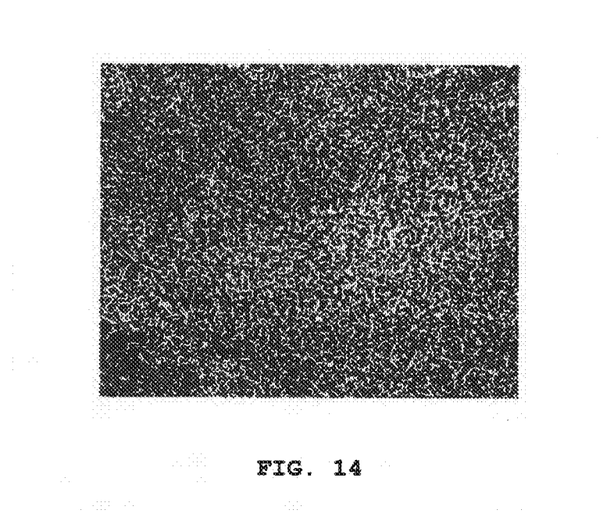
FIG. 14 is an SEM photograph at 200× showing the pore structure of a pellet pressed from a tantalum powder according to the present invention.

FIGS. 13 and 14 are photographs showing that the present uniformly-shaped tantalum fibers of the primary and agglomerated powders are suitable for forming pellet structures having relatively low compaction densities. The tantalum fibers deform under smaller forces and interlock with adjacent fibers to provide pellets with improved green strength. The high green strength also has an added benefit of permitting an agglomerate with little to no fines (−200 mesh) material. In commercially available tantalum powders, fine material often represents 50% or more of the overall powder volume. In those instances, the fine powder particulate fills the spaces between the pores and serve to densify the anode structure. Thus, the fibrous powder allows for an agglomerate particle having a narrow size distribution with few to none little fines that when pressed under relatively low force and then sintered, provides an open network of pores throughout the anode.

Table 2 below provides more detail on pellet pressing parameters according to the present invention.

TABLE 2

| Pellet Pressing Conditions | |
| --- | --- |
| Pressed Density | 3-8 g/cc |
| (Preferred Range) | 4-6.5 g/cc |

Following pellet pressing, the green tantalum structure is sintered by heating to form a coherent body. Sintering is a high temperature process by which two fibers touching each other at a point contact coalesce or are fused together. As known by those skilled in the art, neck growth at the point contact grows to create a new grain boundary. With sufficient time, the contacting surfaces will eventually coalesce into a single large contact or contact neck. An exemplary sintering protocol is described in U.S. Pat. No. 6,965,510 to Liu at al, which is assigned to the assignee of the present invention and incorporated herein by reference. The '510 Liu et al. patent describes sintering a pressed valve metal pellet at a relatively high temperature, but for a relatively short time.

Table 3 below provides more detail on pellet sintering parameters according to the present invention.

TABLE 3

| Pellet Sintering Conditions | |
| --- | --- |
| Sinter Temperature | 1,200-2,200° C. |
| (Preferred Range) | 1,500-1,850° C. |
| Sinter Time | 0.1-120 minutes |
| (Preferred Range) | 1-10 minutes |
| Vacuum Level | $<1 \times 10^{-4}$ Torr (Argon) |
| (Preferred Range) | $<1 \times 10^{-5}$ Torr (Argon) |
| Sintered Pellet | |
| Sintered Density | 4-9 g/cc |
| (Preferred Range) | 5-8 g/cc |
| Pellet Pore Size | Inter granule d50: 1-5 μm |
| (Preferred Range) | Intra granule d50: 30-80 μm |
| Inter Granule Pore | |
| Distribution | d10: 0.5-2 μm |
| | d90: 3-10 μm |
| Intra Granule Pore | |
| Distribution | d10: 20-40 μm |
| | d90: 60-100 μm |

After sintering, the tantalum body is anodized to a desired formation voltage in an anodizing electrolyte. A suitable anodizing electrolyte is described in U.S. Pat. No. 6,231,993 to Stephenson et al., which is assigned to the assignee of the present invention and incorporated herein by reference. An exemplary anodizing electrolyte useful with the formation protocols described in the '993 patent consists of, by volume: about 55% ethylene glycol, about 44.9% to about 43.5% deionized water and about 0.1% to about 1.5% $H_3PO_4$. Such an electrolyte has a conductivity of about 2,500 μS to about 2,600 μS at 40° C. The conductivity of the formation electrolyte can be increased to thereby reduce heat generation inside the anode pellet by using an aqueous electrolyte of $H_3PO_4$ having a conductivity up to about 20,000 μS 40° C.

It is believed in the industry that locally excessive temperatures and insufficient material transport in porous valve metal bodies during anodizing (especially for anodization of high voltage, relatively large, pressed and sintered tantalum powder pellets) causes breakdown or poor anode electrical properties. Because a pressed tantalum pellet is porous, anodizing electrolyte is able to flow into the pellet where it becomes heated during the anodization process. Heated electrolyte that is unable to readily flow out of the pellet can cause the temperature of the electrolyte within the porous structure to increase. It is believed that heated electrolyte in the porous structure is responsible for cracks, fissures and similar imperfections as well as crystalline oxide formed in the oxide coating and inside the tantalum pellet. In addition to contributing to high DC leakage, these faults degrade the voltage to which the anode can be charged before breakdown occurs.

A preferred anodizing method that helps prevent the accumulation of heated electrolyte inside the tantalum body is to taught in U.S. Pat. No. 6,231,993 to Stephenson et al., which is assigned to the assignee of the present invention and incorporated herein by reference.

U.S. Pat. No. 7,727,372 to Liu et al, describes subjecting the tantalum body to a current that decreases over time, a formation voltage that increases over time to a level below the voltage from the power supply and a power level that is self-adjusted to a level that decreases excessive heating in the structure. This patent is assigned to the assignee of the present invention and incorporated herein by reference. A preferred formation voltage range is at least 200 V up to 550V. A more preferred range is from 235 V to 480 V. A most preferred formation voltage range is at least 300 V-up to 550 V.

Thus, a unimodal agglomerated powder with limited particle size distribution according to the present invention has multiple advantages in the formation of a high voltage tantalum anode. A limited particle distribution provides interstitial gaps between the particles that promotes electrolyte flow and cooling of the anode during formation steps. Maintaining a low internal anode temperature during formation is critical for inhibiting growth of crystalline tantalum oxide. Furthermore, a highly porous structure allows for increased formation currents and rates, which increases production throughput and lessens the entrapment of undesirable electrolyte constituents. Moreover, the porous anode network improves conductivity within the final assembled wet capacitor. The resistance (ESR) within the capacitor is reduced by the low anode density and open pores. This lower resistance results in higher efficiencies.

Table 4 below demonstrates the difference in performance properties of anodes from the prior art QR-3 tantalum powder in comparison to tantalum fibers according to the present invention.

TABLE 4

| Powder | Volume (cc) | Charge Wt | 37C AC Cap (microF) | 37C ESR (Ohms) | Eout1 (J) | J/cc | J/g |
|---|---|---|---|---|---|---|---|
| Fiber | 0.866 | 5.5 | 120.86 | 6.84 | 9.33 | 10.76 | 1.70 |
| Fiber | 0.873 | 5.5 | 123.20 | 6.91 | 9.48 | 10.86 | 1.72 |
| QR-3 Flake | 0.859 | 6.5 | 94.74 | 6.23 | 7.05 | 8.21 | 1.08 |
| QR-3 Flake | 0.854 | 6.5 | 94.68 | 6.57 | 7.06 | 8.27 | 1.09 |

Figure 15:
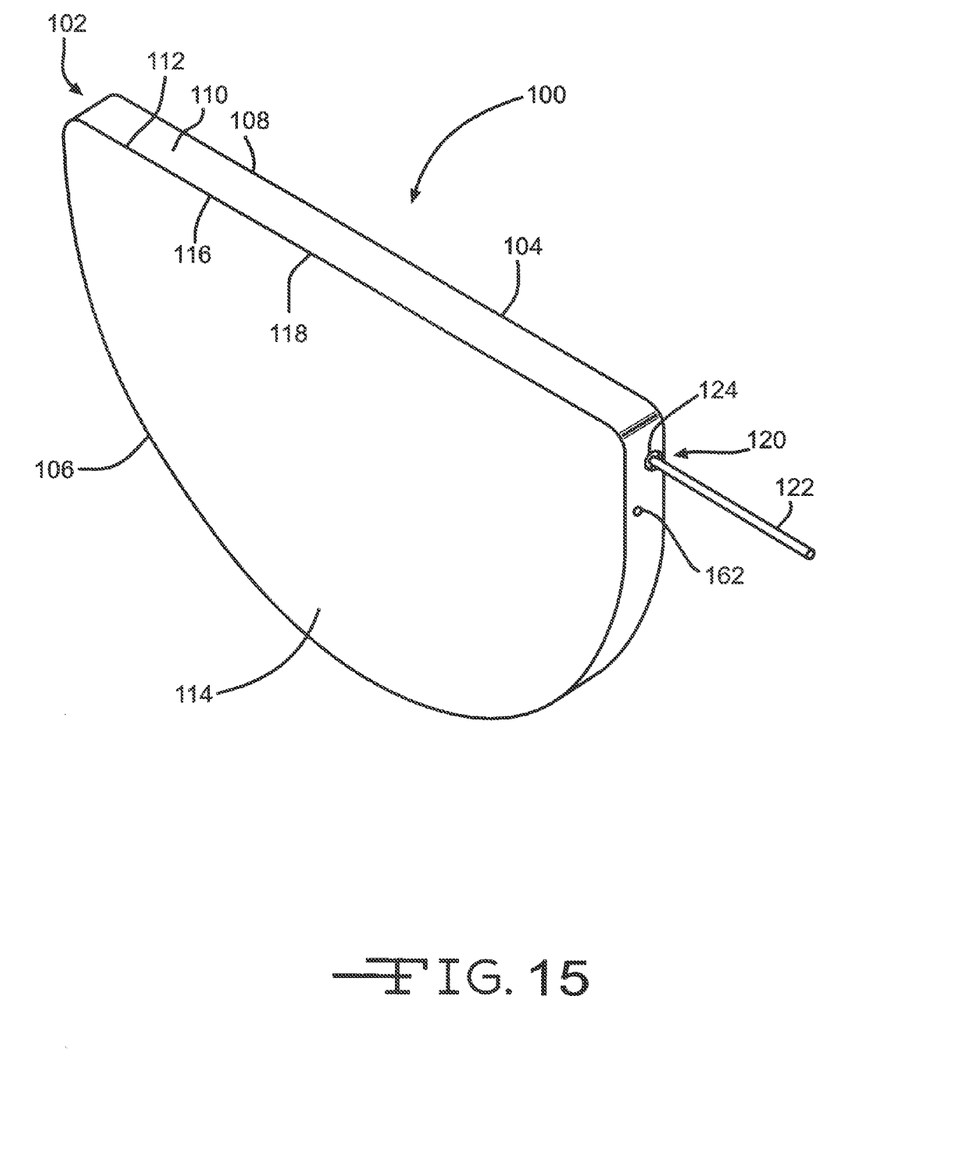
FIG. 15 is a perspective view of a capacitor 100 according to the present invention.
Figure 16:
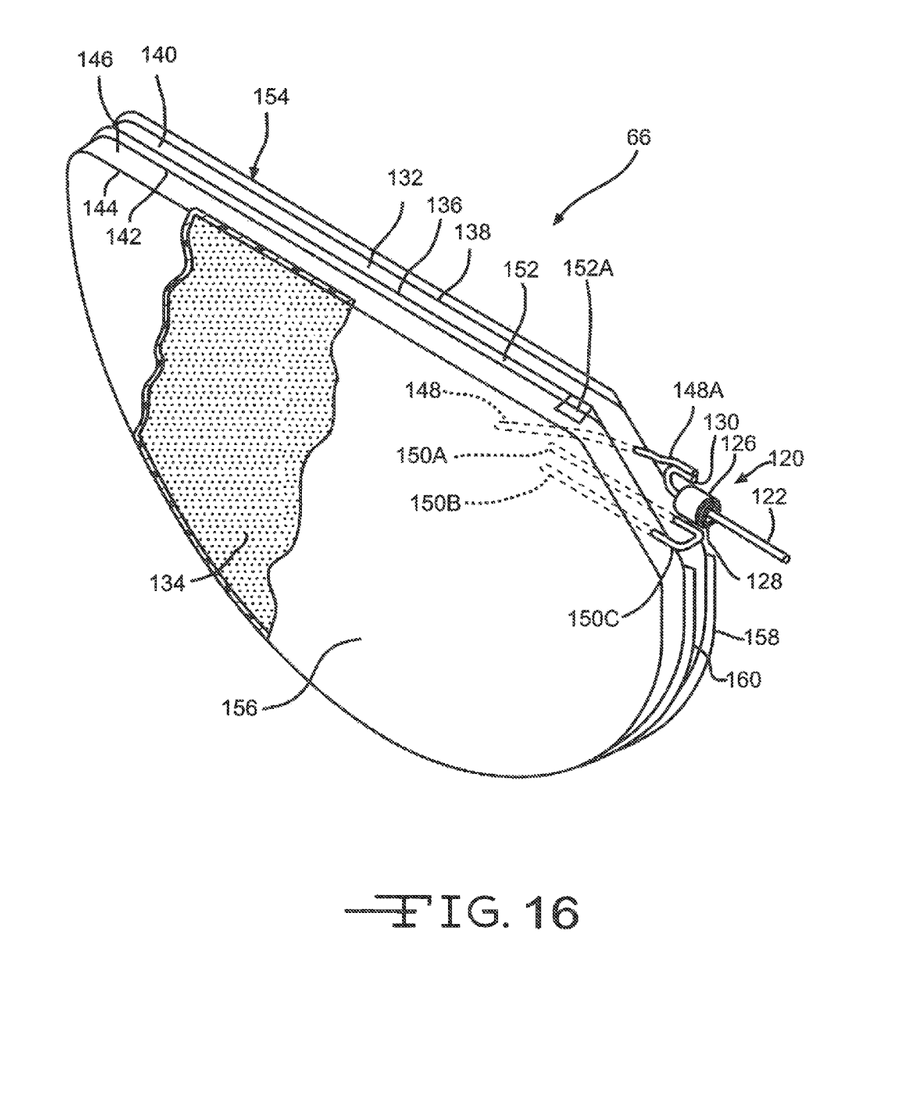
FIG. 16 is a perspective view of a dual anode/cathode assembly for the capacitor 100 shown in FIG. 15.

Referring now to FIGS. 15 and 16, an exemplary capacitor 100 according to the present invention is shown. The capacitor 100 comprises at least two anodes of an anode active material and a cathode of a cathode active material housed inside a hermetically sealed casing 102. The capacitor electrodes are operatively associated with each other by a working electrolyte (not shown) contained inside the casing.

The casing 102 comprises first and second metal casing members 104 and 106. The metal casing portions 104, 106 are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the casing portions 104, 106 have a thickness of about 0.001 to about 0.015 inches.

First casing member 104 is of a drawn metal structure comprising a first face wall 108 joined to a surrounding side wall 110 extending to an edge 112. Additionally, casing portion 104 can be of a machined construction or be formed by a metal injection molding process. Second casing member 106 is in the shape of a plate and comprises a second face wall 114 having a surrounding edge 116. The casing members 104 and 106 are hermetically sealed together by welding the overlapping edges 112 and 116 where they contact each other. The weld 118 is provided by any conventional means; however, a preferred method is by laser welding.

A feedthrough 120 electrically insulates an anode terminal wire 122 from the casing 12. The terminal wire 122 extends from within the casing 102 to the outside thereof. The location of a hole 124 in the surrounding side wall 110 of the casing member 104 into which the feedthrough 120 is mounted is preferably offset towards the front edge 112 or towards the face wall 108 in order to align with an embedded wire of one of the anodes, as will be described subsequently.

Feedthrough 120 is a glass to metal seal (GTMS) comprising a ferrule 126 defining an internal cylindrical through bore or passage of constant inside diameter. An insulative glass 128 provides a hermetic seal between the bore of the ferrule 126 and the anode terminal wire 122 passing therethrough. The terminal wire 122 has a J-shaped interior portion 130 for connection to one or more anode wires within casing 102. The glass 128 is, for example, ELAN® type 88 or MANSOL™ type 88.

Capacitor 100 further comprises an anode assembly two or more anodes made as previously described and connected to the terminal wire 122 of feedthrough 120 within the casing 102. The anode assembly includes a first anode pellet 132 and a second anode pellet 134. The first anode pellet 132 comprises an inner major face wall 136 and an outer major face wall 138, both extending to a surrounding edge 140. Similarly, the second anode pellet 134 comprises an inner major face wall 142 and an outer major face wall 144, both extending to a surrounding edge 146.

An anode wire 148 that is partially embedded in the first anode pellet 132 has a distal end 148A that is electrically connected to the J-shaped interior portion 130 of the terminal wire 122. The anode wire 148 is preferably of tantalum. As previously described, the tantalum anode pellets 132 and 134 are sintered under a vacuum at high temperatures and then anodized in a suitable electrolyte. The anodizing electrolyte fills the pores of the tantalum pellets 132, 134 and a continuous dielectric oxide is formed thereon. In that manner, the anode pellets 132, 134 and extending wire 148 are provided with a dielectric oxide layer formed to a desired working or formation voltage.

A second U-shaped wire has an end portion 150A embedded in the first pellet 132 and a second end portion 1505 embedded in the second pellet 134. The second wire has an exposed U-shaped portion 150C. Thus, the U-shaped anode wire is not directly connected to the terminal wire 122 or to the wire 148 of anode pellet 132. Instead, it connects directly to the first and second anode pellets 132, 134, and continuity to the embedded wire 148 is through the active material of the first anode pellet 132. In this manner, the anode pellets 132 and 134 are connected to terminal wire 122 in series.

After the anode pellet 132 and extending wire 148 are anodized to the desired formation voltage, the dielectric oxide is removed from the wire. The wire 148 is subsequently connected to an anode lead 122 supported in an insulative glass of the glass-to-metal seal 120 (GTMS). Laser welding secures the wire 122 and lead 148 together. The wire 148 and connected lead 122 are then re-anodized.

The U-shaped anode wire bridging between anode pellets 132, 134 and the feedthrough of wire 122 including its J-shaped portion 130 joined to the distal end 148A of wire 148 is enclosed and immobilized within a molded polymer (not shown). The various anode wires, whether embedded or not, are preferably positioned near the central regions of the respective anode pellets 132 and 134, i.e., equidistant from the inner and outer face walls of the pellets.

The cathode Of capacitor 100 comprises cathode active material supported by and in contact with the face walls of the casing members 102 and 104. More particularly, cathode active material contacts the inner surfaces of the respective casing face walls 108 and 114 in a pattern that generally mirrors the shape of the anode pellets 132 and 134. The cathode active material has a thickness of about a few hundred Angstroms to about 0.1 millimeters and is either directly coated on the inner surfaces of the face walls 108, 114 or it is coated on a conductive substrate (not shown) supported on and in electrical contact with the inner surfaces thereof.

Another portion of the cathode active material is positioned intermediate the anodes 132 and 134. The intermediate cathode active material is supported on opposed surfaces of a cathode current collector 152, preferably in the form of a foil. That way, the cathode current collector 152 having opposed first and second major faces provided with cathode active material thereon is positioned opposite the first and second anodes 132 and 134, thereby forming an anode-cathode assembly. A tab 152A is provided on current collector 152 for tack welding to the inner surface of the face wall 108, surrounding side wall 110 of casing member 104, or to the second face wall 114. The tab 152A is bent approximately perpendicular to the respective surrounding edges 140 and 146 of anode pellets 132 and 134 to position it for welding to side wall 110. The casing 102 comprising members 104, 106 serves as the cathode terminal.

In that respect, the face walls 108, 114 of the casing portions 132, 134 may be of an anodized-etched conductive material, have a sintered active material with or without oxide contacted thereto, be contacted with a double layer capacitive material, for example a finely divided carbonaceous material such as graphite, activated carbon, carbon or platinum black, a redox, pseudocapacitive or an under potential material, or be an electroactive conducting polymer such as polyaniline, polypyrrole, polythiophene, polyacetylene, and mixtures thereof.

According to one preferred aspect of the present invention, the redox or cathode active material includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

A pad printing process as described in U.S. Pat. No. 7,116,547 is preferred for making such a coating. An ultrasonically generated aerosol as described in U.S. Pat. Nos. 5,894,403, 5,920,455, 6,224,985, and 6,468,605, all to Shah et al., is also a suitable deposition method. These are assigned to the assignee of the present invention and incorporated herein by reference.

The capacitor 100 preferably comprises separators of electrically insulative material that completely surround and envelop the anode pellets 132, 134. For example, a first separator 154 encloses the first anode 132 and a second separator 156 encloses the second anode pellet 134. The separators 154, 156 may be formed as pouches that enclose the respective anode pellets 132, 134. In particular, separator 154 is sealed at a flap 158 of material that extends around the majority of the perimeter of anode pellet 132 except at the feedthrough wire 148A and embedded wire 150A. In like manner, separator pouch 156 is sealed at a flap 160 of material that extends around the majority of the perimeter of anode pellet 134 with anode wire 150B extending therefrom. The individual sheets of separator material are closed at flaps 158 and 160 by a process such as ultrasonic welding, or heat sealing.

The separators 154 and 156 prevent an internal electrical short circuit between the anode and cathode active materials in the assembled capacitor and have a degree of porosity sufficient to allow ion flow therethrough during the charge and discharge of the capacitor 100. Illustrative separator materials include woven and non-woven fabrics of polyolefinic fibers including polypropylene and polyethylene or fluoropolymeric fibers including polyvinylidene fluoride, polytetrafluoroethylene, and polyethylenechlorotrifluoroethylene laminated or superposed with a polyolefinic or fluoropolymeric microporous film, non-woven glass, glass fiber materials and ceramic materials. Additional separator materials may include films of poly sulfone and polyester, for example, polyethylene terephthalate. Suitable microporous films include a polyethylene membrane commercially available under the designation SOLUPOR® (DMS Solutech), a polytetrafluoroethylene membrane commercially available under the designation ZITEX® (Chemplast Inc.) or EXCELLEPATOR® (W. L. Gore and Associates), a polypropylene membrane commercially available under the designation CELGARD® (Celanese Plastic Company, Inc.), and a membrane commercially available under the designation DEXIGLAS® (C. H. Dexter, Div., Dexter Corp.). Cellulose based separators are also useful. Depending on the electrolyte used, the separator 18 can be treated to improve its wettability, as is well known by those skilled in the art. A preferred separator structure 18 comprises a non-woven layer of polyethylene or polypropylene, a microporous layer of polyethylene or polypropylene, and, possibly a third layer of polyethylene or polypropylene, which is also non-woven. Regardless its material of construction, the separator must be protected from the heat generated when casing portion 104 is secured to casing portion 106 by weld 118.

In a final step of providing capacitor 100, the void volume in casing 102 is filled with a working electrolyte (not shown) through a fill opening 162. This hole is then welded closed to complete the sealing process. A suitable working electrolyte for the capacitor 10 is described in U.S. Pat. No. 6,219,222 to Shah et al., which includes a mixed solvent of water and ethylene glycol having an ammonium salt dissolved therein. U.S. Pat. No. 6,687,117 to Liu and U.S. Patent Application Pub. No. 2003/0090857 describe other electrolytes for the present capacitor 100. The electrolyte of the latter publication comprises water, a water-soluble inorganic and/or organic acid and/or salt, and a water-soluble nitro-aromatic compound while the former relates to an electrolyte having de-ionized water, an organic solvent, isobutyric acid and a concentrated ammonium salt. These patents and publication are assigned to the assignee of the present invention and incorporated herein by reference.

While capacitor 100 has been described as comprising cathode current collector 152 supporting cathode active material on its opposite major sides and positioned intermediate the parallel connected anodes 132 and 134 that is by way of example. Those skilled in the art will readily understand that a capacitor according to the present invention can further have three or more to "n" anodes connected in parallel with each other by bridging U-shaped anode wires (150A, 150B and 150C). There will be cathode active material supported on the inner surfaces of the casing walls 108, 114 and facing the first and the $n^{th}$ anodes.

For a more detailed description of an exemplary capacitor useful with the tantalum fibers according to the present invention, reference is made to U.S. Pat. No. 7,483,260 to Ziarniak et al. The '260 patent is assigned to the assignee of the present invention and incorporated herein, by reference.

Thus, it should be apart to those of ordinary skill in the art that the uniqueness of the present invention is the ability to press an anode pellet having good integrity, good pore structure and that is capable of being formed at high voltages. Resultant from this is the ability to design and fabricate capacitors with higher voltages vs. the prior art. That is because the anodes of the present invention have higher energy density and substantially low ESR in comparison to those made according to the prior art. This is achieved by the present invention through the use of the starting tantalum fiber material and the specific processing that creates this anodized anode body.

Although several embodiments of the invention have been described in detail, for purposes of illustration, various modifications of each may be made without departing from the spirit and scope of the invention. Accordingly, the invention is not to be limited, except as by the appended claims.

What is claimed is:

1. A method for providing an anode for a high voltage implantable electrolytic capacitor, the method comprising the steps of:
   a) providing tantalum fibers having a diameter ranging from 0.5 μm to 2.5 μm and a length ranging from 5 μm to 50 μm;
   b) providing a primary tantalum powder as a loosely packed mass of the tantalum fibers;
   c) agglomerating the primary tantalum powder into a randomly oriented, substantially non-aligned, porous agglomerated tantalum powder;
   d) pressing the agglomerated tantalum powder into a tantalum pellet of a desired shape;
   e) sintering the tantalum pellet into a coalesced body of the tantalum fibers to thereby provide a sintered tantalum pellet; and
   f) anodizing the sintered tantalum pellet to a formation voltage of at least 300 V to form an anode having a dielectric oxide on the tantalum fibers.

2. The method of claim 1 including providing the tantalum fibers having an length:diameter aspect ratio of 10 to 40.

3. The method of claim 1 including providing the tantalum fibers having a length:diameter aspect ratio of 2 to 100.

4. The method of claim 1 including providing the agglomerated tantalum powder having an agglomerated density ranging from 1.5 g/cc to 4.5 g/cc.

5. The method of claim 1 including providing the agglomerated tantalum powder having a d50 agglomerated diameter distribution ranging from 200 μm to 500 μm.

6. The method of claim 1 including providing the agglomerated tantalum powder having an agglomerate diameter distribution at d10: of 74 μm to d90: of 1,000 μm.

7. The method of claim 1 including providing the agglomerated tantalum powder having a d50 agglomerate pore size ranging from 1 μm to 5 μm.

8. The method of claim 1 including providing agglomerated tantalum powder having an agglomerate pore distribution d10: of 0.5 μm and d90: of 20 μm.

9. The method of claim 1 including providing the tantalum pellet having a pressed density of 3 g/cc to 8 g/cc.

10. The method of claim 1 including sintering the tantalum pellet at a temperature ranging from 1,200° C. to 2,200° C.

11. The method of claim 1 including sintering the tantalum pellet for a time ranging from 0.1 minutes to 120 minutes.

12. The method of claim 1 including sintering the tantalum pellet at a vacuum of $<1\times10^{-4}$ Torr (Argon).

13. The method of claim 1 including providing the sintered tantalum pellet having a sintered density ranging from 4 g/cc to 9 g/cc.

14. The method of claim 1 including providing the sintered tantalum pellet having a d50 inter-granule size distribution ranging from 1 μm to 5 μm.

15. The method of claim 1 including providing the sintered tantalum pellet having a d50 intra-granule size distribution ranging from 30 μm to 80 μm.

16. The method of claim 1 including providing the sintered tantalum pellet having a d10 inter-granular pore distribution ranging from 0.5 μm to 2 μm and a d90 inter-granular pore distribution ranging from 3 μm to 10 μm.

17. The method of claim 1 including providing the sintered tantalum pellet having a d10 intra granule pore distribution ranging 20 μm to 40 μm a d90 intra granule pore distribution ranging from 60 μm to 100 μm.

18. The method of claim 1 including anodizing the sintered tantalum pellet to a formation voltage ranging from 300 V to 550 V.

* * * * *

UNITED STATES PATENT AND TRADEMARK OFFICE
CERTIFICATE OF CORRECTION

PATENT NO.        : 9,312,075 B1
APPLICATION NO.   : 14/479689
DATED             : April 12, 2016
INVENTOR(S)       : Liu et al.

Page 1 of 1

It is certified that error appears in the above-identified patent and that said Letters Patent is hereby corrected as shown below:

In the specification

Column 12, line 22 delete "SOLUPOR®" and insert --SOLUPOR®--

Column 12, line 24 delete "ZiTEX®" and insert --ZITEX®--

Column 12, line 25 delete "EXCELLEPATOR®" and insert --EXCELLEPATOR®--

Column 12, line 27 delete "CELGARD®" and insert --CELGARD®--

Column 12, line 29 delete "DEXIGLAS®" and insert --DEXIGLAS®--

Signed and Sealed this
Ninth Day of August, 2016

Michelle K. Lee
*Director of the United States Patent and Trademark Office*